(12) United States Patent
Liu et al.

(10) Patent No.: US 10,819,546 B2
(45) Date of Patent: Oct. 27, 2020

(54) CONFIGURATION METHOD FOR PHYSICAL CHANNEL, BASE STATION AND USER EQUIPMENT

(71) Applicant: SHARP KABUSHIKI KAISHA, Sakai, Osaka (JP)

(72) Inventors: Renmao Liu, Shanghai (CN); Fangying Xiao, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/773,321

(22) PCT Filed: Nov. 4, 2016

(86) PCT No.: PCT/CN2016/104521
§ 371 (c)(1),
(2) Date: May 3, 2018

(87) PCT Pub. No.: WO2017/076319
PCT Pub. Date: May 11, 2017

(65) Prior Publication Data
US 2018/0324017 A1    Nov. 8, 2018

(30) Foreign Application Priority Data

Nov. 5, 2015 (CN) .......................... 2015 1 0745520

(51) Int. Cl.
*H04W 52/08* (2009.01)
*H04W 72/14* (2009.01)
(Continued)

(52) U.S. Cl.
CPC ........ *H04L 27/2605* (2013.01); *H04L 5/0053* (2013.01); *H04L 5/0094* (2013.01);
(Continued)

(58) Field of Classification Search
CPC ... H04W 4/70; H04W 72/0453; H04W 24/10; H04W 28/18; H04W 48/16;
(Continued)

(56) References Cited

U.S. PATENT DOCUMENTS

| 7,904,778 B2 * | 3/2011 | Yamada .................. H04L 1/003 714/749 |
| 2007/0081507 A1 * | 4/2007 | Koo .................... H04B 7/15542 370/338 |

(Continued)

FOREIGN PATENT DOCUMENTS

| CN | 102916918 A | 2/2013 |
| CN | 103688480 A | 3/2014 |
| CN | 104641582 A | 5/2015 |

OTHER PUBLICATIONS

3rd Generation Partnership Project; Technical Specification Group Radio Access Network; Evolved Universal Terrestrial Radio Access (E-UTRA); User Equipment (UE) radio transmission and reception (Release 13), 3GPP TS 36.101 V13.1.0 (Oct. 2015).
(Continued)

*Primary Examiner* — Sai Aung
(74) *Attorney, Agent, or Firm* — ScienBiziP, P.C.

(57) ABSTRACT

The present invention provides a method for transmitting a downlink signal, which is suitable for narrow-band systems such as NB-IOT, eMTC and MMTC, a base station for executing the method, and a user equipment. The method comprises: receiving a master information block; parsing a field in the received master information block, the field being used to indicate a starting OFDM symbol for downlink reception; and receiving a downlink signal according to the parsed starting OFDM symbol.

4 Claims, 6 Drawing Sheets

(51) Int. Cl.
*H04B 1/00* (2006.01)
*H04L 27/26* (2006.01)
*H04L 5/00* (2006.01)
*H04W 48/10* (2009.01)
*H04W 4/70* (2018.01)
*H04W 72/04* (2009.01)

(52) U.S. Cl.
CPC ......... *H04L 27/2602* (2013.01); *H04W 48/10* (2013.01); *H04L 5/0007* (2013.01); *H04W 4/70* (2018.02); *H04W 72/042* (2013.01)

(58) Field of Classification Search
CPC ........... H04W 72/0406; H04W 72/042; H04W 72/0446; H04W 72/048; H04W 72/1268; H04W 72/1289
See application file for complete search history.

(56) References Cited

U.S. PATENT DOCUMENTS

| | | | | |
|---|---|---|---|---|
| 2009/0164638 | A1* | 6/2009 | Jang | H04W 72/10 709/226 |
| 2011/0274074 | A1* | 11/2011 | Lee | H04L 5/0053 370/329 |
| 2013/0142138 | A1* | 6/2013 | Dinan | H04W 72/04 370/329 |
| 2014/0064067 | A1* | 3/2014 | Drewes | H04L 5/0044 370/230 |
| 2014/0153539 | A1 | 6/2014 | Seo et al. | |
| 2015/0208392 | A1 | 7/2015 | Park et al. | |
| 2015/0215905 | A1 | 7/2015 | Park et al. | |
| 2015/0215906 | A1 | 7/2015 | Park et al. | |
| 2015/0223208 | A1 | 8/2015 | Park et al. | |
| 2015/0229451 | A1 | 8/2015 | Park et al. | |
| 2015/0236828 | A1 | 8/2015 | Park et al. | |
| 2015/0282126 | A1 | 10/2015 | Park et al. | |
| 2015/0289235 | A1 | 10/2015 | Park et al. | |
| 2015/0381330 | A1* | 12/2015 | Chen | H04L 5/0046 370/329 |

OTHER PUBLICATIONS

Source: Qualcomm Incorporated, Title: NarrowBand IOT (NB-IOT), RP-151621, 3GPP TSG RAN Meeting #69, Phoenix, USA, Sep. 14-16, 2015.
Source: Ericsson, NSN, Title: Even Lower Complexity and Enhanced Coverage LTE UE for MTC, RP-140990, 3GPP TSG RAN Meeting #64 Sophia Antipolis, France, Jun. 10-13, 2014.
Huawei, Hisilicon; "General design principles"; R1-155961 3GPP TSG RAN WG1 Meeting #82bis, Malmo, Sweden, Oct. 5-9, 2015.
Huawei, Hisilicon; "Considerations on the spare bits in MIB"; R1-153215 3GPP TSG RAN WG1 Meeting #81, Fukuoka, Japan, May 25-29, 2015.
Samsung; "Power Consumption Reduction Techniques for Rel-13 Low Cost UEs"; R1-150346 3GPP TSG RAN WG1 #80, Athens, Greece, Feb. 9-13, 2015.

* cited by examiner

| Table 1 MIB1 in the stand-alone mode | | | Table 2 MIB2 in the guard-band mode | | | Table 3 MIB3 in the in-band mode | |
|---|---|---|---|---|---|---|---|

| Field | The number of bits |
|---|---|
| System frame number | X1 |
| System information tag value | X2 |
| Field 3 | X3 |
| Field 4 | X4 |
| Remaining bits | X5 |

| Field | The number of bits |
|---|---|
| System frame number | X1 |
| System information tag value | X2 |
| Field 3 | X3 |
| Field 4 | X4 |
| Field 5 | X5 |
| Remaining bits | X6 |

| Field | The number of bits |
|---|---|
| Downlink bandwidth | 3 |
| System frame number | X2 |
| System information tag value | X3 |
| Field 4 | X4 |
| Field 5 | X5 |
| Field 6 | X6 |
| Remaining bits | X7 |

| Field | Number of bits |
|---|---|
| Field 1 | 2 |
| Field 2 | X2 |
| Field 3 | X3 |
| Field 4 | X4 |
| ... | ... |
| Remaining bits | Xn |

Description of Field 1 (2 bits):

00 indicates starting OFDM symbol in stand-alone mode 01 indicates starting OFDM symbol in guard-band mode 10 indicates that starting OFDM symbol in in-band mode is third OFDM symbol 11 indicates that starting OFDM symbol in in-band mode is fourth OFDM symbol In addition, meanings of other fields may also depend on information of 2 bits of Field 1

CONFIGURATION METHOD FOR PHYSICAL CHANNEL, BASE STATION AND USER EQUIPMENT

TECHNICAL FIELD

The present invention relates to the technical field of wireless communications. More specifically, the present invention relates to a configuration method for physical channels, and a corresponding base station and user equipment.

BACKGROUND

With rapid growth of mobile communications and great progress of technology, the world will move towards a fully interconnected network society where anyone or anything can get information and share data anytime and anywhere. It is estimated that there will be 50 billion interconnected equipments by 2020, where only about 10 billion may be mobile phones and tablet computers, while the other are not machines dialoguing with people but machines dialoguing with each other. Therefore, how to design a system to better support the Internet of Everything is a subject needing an in-depth study.

In the standard of Long Term Evolution (LTE) of the Third Generation Partnership Project (3GPP), machine-to-machine communication is called machine type communication (MTC). The MTC is a data communication service that does not need human participation. Deployment of large-scale MTC user equipments can be used in such fields as security, tracking, billing, measurement and consumer electronics, and specifically relates applications, including video monitoring, supply chain tracking, intelligent meter reading, and remote monitoring. MTC requires lower power consumption and supports lower data rate and lower mobility. The current LTE system is mainly for man-to-man communication services. The key to achieving competitive advantages of scale and application prospects of MTC services is that the LTE network supports low-cost MTC equipments.

In addition, some MTC user equipment needs to be installed in the basement of a residential building or at a position under the protection of an insulating foil, a metal window, or the thick wall of a traditional building; as compared with known equipment terminals (such as mobile phones and tablet computers) in LTE networks, the air interfaces of such equipment will obviously suffer from more serious penetration losses. 3GPP decides to study the project design and performance evaluation of additional 20 dB coverage enhanced MTC equipments. It should be noted that MTC equipments located at poor network coverage areas have the following characteristics: extremely low data transmission rates, loose delay requirements, and limited mobility. In view of the above characteristics of MTC, the LTE network can further optimize some signals and/or channels to better support MTC services.

Therefore, at the 3GPP RAN #64 plenary session held in June 2014, a new Rel-13-oriented work item of MTC with low complexity and coverage enhancement was proposed (see NPL: RP-140990 New Work Item on Even Lower Complexity and Enhanced Coverage LTE UE for MTC, Ericsson, NSN). In the description of this work item, the LTE Rel-13 system needs to support MTC user equipment having uplink/downlink 1.4 MHz RF bandwidth to operate at any system bandwidth (e.g., 1.4 MHz, 3 MHz, 5 MHz, 10 MHz, 15 MHz, 20 MHz). The standardization of the work item will be completed at the end of 2015.

In addition, in order to better implement the Internet of Everything, another new work item was proposed at the 3GPP RAN #69 plenary session held in September 2015 (see NPL: RP-151621 New Work Item: NarrowBand IOT (NB-IOT)), which may be referred to as Narrowband Internet of Things (NB-IOT). In the description of this work item, NB-IOT needs to support uplink/downlink 180 KHz RF bandwidth and support three modes of operation: stand-alone mode of operation, guard-band mode of operation, and in-band mode of operation. The stand-alone mode of operation is to implement NB-IOT on the existing GSM band. The guard-band mode of operation is to implement NB-IOT on the guard band of one LTE carrier. The in-band mode of operation is to implement NB-IOT on the existing LTE band. Different bearer modes may adopt different physical parameters and processing mechanisms. It will be favorable for designing and optimizing the system that the mode of operation adopted by NB-IOT be known as early as possible.

In the existing LTE system, an LTE UE receives a physical downlink channel through control information carried by a broadband physical downlink control channel (PDCCH). Alternatively, the LTE UE receives a UE-specific enhanced physical downlink control channel (EPDCCH) through control information carried by the broadband physical downlink control channel (PDCCH), and may then receive the physical downlink channel through the control information carried by the EPDCCH. Because NB-IOT can only work on the uplink/downlink 180 KHz (corresponding to a bandwidth occupied by one physical resource block (PRB)), the broadband PDCCH uses a bandwidth of 20 M (corresponding to a bandwidth occupied by 100 PRBs). In some cases (for example, in the in-band mode of operation), the NB-IOT even needs to avoid the PDCCH control region of the existing LTE. Therefore, the NB-IOT cannot use the Physical Downlink Control Channel (PDCCH) of the existing LTE to transmit control information.

Similarly, in a system such as enhanced MTC (eMTC) and Massive MTC (MMTC), the working frequency band is also smaller than the bandwidth of 20 M used by the broadband PDCCH of the existing LTE, and thus the control information cannot be received in accordance with the existing manner.

Therefore, there is a need for a new resource configuration mechanism suitable for narrow-band systems such as NB-IOT, eMTC and MMTC to notify a user equipment of configuration information such as the mode of operation, the configuration mode of a master information block, and a starting OFDM symbol for downlink transmission/reception.

SUMMARY OF INVENTION

The present invention is intended to provide a new mechanism for transmitting a downlink signal, which is suitable for narrow-band systems such as NB-IOT, eMTC and MMTC, a base station for executing the mechanism, and a user equipment.

According to a first aspect of the present invention, there is provided a method performed in a user equipment, including: receiving a master information block; parsing a field in the received master information block, the field being used to indicate a starting orthogonal frequency division multiplexing (OFDM) symbol for downlink reception; and receiving a downlink signal according to the parsed starting OFDM symbol.

According to a second aspect of the present invention, a method performed in a base station is provided. The method includes: determining a starting OFDM symbol for downlink transmission; generating a master information block that includes a field indicating the starting OFDM symbol; transmitting the generated master information block; and transmitting a downlink signal according to the starting OFDM symbol.

According to a third aspect of the present invention, a user equipment is provided. The user equipment includes: a receiving unit, configured to receive a master information block; and a processing unit, configured to parse a field in the received master information block, the field being used to indicate a starting OFDM symbol for downlink reception, wherein the receiving unit is further configured to receive a downlink signal according to the parsed starting OFDM symbol.

According to a fourth aspect of the present invention, a base station is provided. The base station includes: a processing unit, configured to determine a starting OFDM symbol for downlink transmission, and generate a master information block that includes a field indicating the starting OFDM symbol; and a transmitting unit, configured to transmit the generated master information block, and transmit a downlink signal according to the starting OFDM symbol.

In some embodiments, a field indicating a starting OFDM symbol for downlink reception is included in the master information block.

The field indicating the starting OFDM symbol for downlink reception may occupy 1 or 2 bits in a predefined position in the master information block. For example, the field indicating the starting OFDM symbol for downlink reception may occupy 1 or 2 bits in a starting position, a middle position, an ending position, or other positions in the master information block.

Preferably, the field indicating the starting OFDM symbol for downlink reception may further define meanings of other fields in the master information block.

BRIEF DESCRIPTION OF DRAWINGS

The above and other features of the present invention will become more apparent from the following detailed description in conjunction with the accompanying drawings.

FIG. 6.1, FIG. 6.2 and FIG. 6.3 illustrate schematic diagrams of examples of reference signals that can be used for physical channel demodulation in three modes of operation according to an embodiment of the present invention.

In the accompanying drawings, same reference numerals indicate same or similar elements.

DESCRIPTION OF EMBODIMENTS

The following describes the present invention in detail with reference to the accompanying drawings and specific embodiments. It should be noted that the present invention is not limited to this specific embodiments. In addition, for simplicity, a detailed description of the known art not directly related to the present invention is omitted to prevent confusion with the understanding of the present invention.

In the following description, a plurality of implementation modes of the present invention are described in detail by taking a base station and a user equipment that support NB-IOT as examples and taking an LTE mobile communication system and its subsequent evolved versions as exemplary application environments. However, it should be noted that the present invention is not limited to the following implementation modes, but can be applied to more other wireless communication systems, such as future 5G cellular communication systems, and can also be applied to other base stations and user equipments, such as base stations and user equipments that support eMTC and MMTC.

Figure 1:
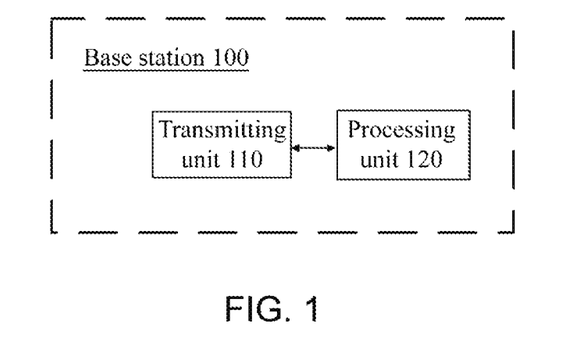
FIG. 1 illustrates a block diagram of a base station according to an embodiment of the present invention.

FIG. 1 illustrates a block diagram of a base station (BS) 100 for a narrow-band Internet of Things according to the present invention. It should be understood that the BS 100 may be a new stand-alone equipment or may be implemented by modifying an existing LTE base station. As shown in the figure, the BS 100 includes a transmitting unit 110 and a processing unit 120. Those skilled in the art should understand that the BS 100 may also include other functional units necessary for implementing its functions, such as various memories, radio frequency receiving units, baseband signal generating/extracting units, physical uplink channel reception processing units, and other physical downlink channel transmission processing units. However, for the sake of simplicity, detailed descriptions of these well-known elements are omitted.

The processing unit 120 determines the mode of operation of the narrow-band Internet of Things that needs to be transmitted, primary synchronization signals, secondary synchronization signals, scrambling sequences of the secondary synchronization signals, combination modes of sequences in the secondary synchronization signals, relative positions of the primary synchronization signals and the secondary synchronization signals in the time domain and/or frequency domain, master information blocks, reference signals for physical broadcast channel demodulation, and/or a starting OFDM symbol for downlink transmission and the like.

The transmitting unit 110 transmits a relevant physical channel and/or signal according to a result determined by the processing unit 120 and in a manner corresponding to the result.

In some embodiments, the processing unit 120 may determine a starting OFDM symbol for downlink transmission and generate a master information block that includes a field indicating the starting OFDM symbol. The transmitting unit 110 may transmit the generated master information block. The transmitting unit 110 may also transmit a downlink signal according to the starting OFDM symbol determined by the processing unit 120.

The field indicating the starting OFDM symbol may occupy 1 or 2 bits in a predefined position in the master information block, for example, 1 or 2 bits in a starting position, a middle position, an ending position, or other positions in the master information block.

Preferably, the field indicating the starting OFDM symbol for downlink reception may further define meanings of other fields in the master information block.

Figure 2:
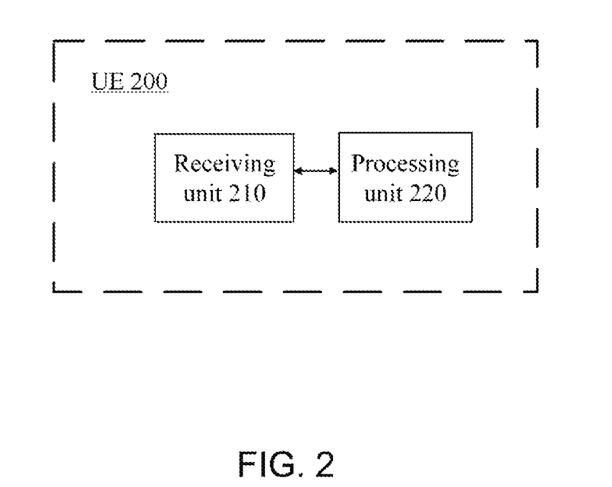
FIG. 2 illustrates a block diagram of a user equipment according to an embodiment of the present invention.

FIG. 2 illustrates a block diagram of a user equipment (UE) 200 for a narrow-band Internet of Things according to the present invention. As shown in the figure, the UE 200 includes a receiving unit 210 and a processing unit 220. Those skilled in the art should understand that the UE 200 also includes other functional units necessary for implementing its functions, such as various memories, radio frequency transmitting units, baseband signal generating/extracting units, physical uplink channel transmission processing units, and other physical downlink channel reception processing units. However, for the sake of simplicity, detailed descriptions of these well-known elements are omitted.

The processing unit 220 determines the mode of operation of the narrow-band Internet of Things that needs to be received, primary synchronization signals, secondary synchronization signals, scrambling sequences of the secondary synchronization signals, combination modes of sequences in the secondary synchronization signals, relative positions of the primary synchronization signals and the secondary synchronization signals in the time domain and/or frequency domain, master information blocks, reference signals for physical broadcast channel demodulation, and/or a starting OFDM symbol for downlink transmission and the like.

The receiving unit 210 receives a relevant physical channel and/or signaling according to a result determined by the processing unit 220 and in a manner corresponding to the result.

In some embodiments, the receiving unit 210 may receive the master information block. The processing unit 220 may determine a starting OFDM symbol for downlink reception by parsing a field included in the master information block received by the receiving unit 210, the field being used to indicate the starting OFDM symbol for downlink transmission. Therefore, the receiving unit 210 may further receive a downlink signal according to the starting OFDM symbol determined by the processing unit 220.

The specific implementation mechanisms of the base station and the user equipment according to the embodiments of the present invention are introduced below with reference to the accompanying drawings.

Embodiment 1

Figure 3:
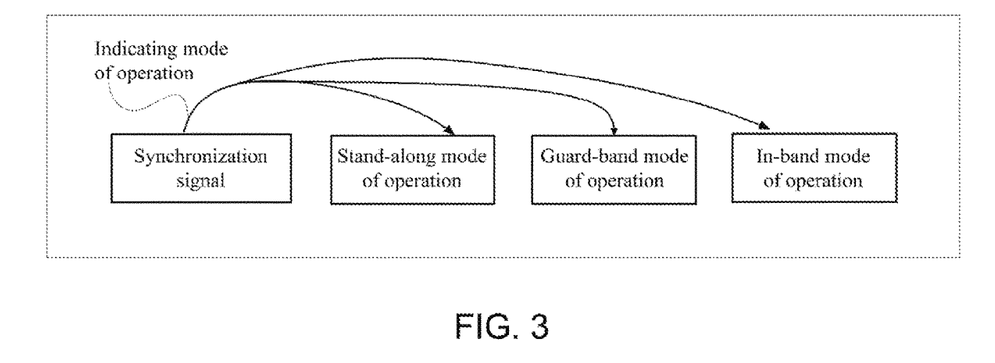
FIG. 3 illustrates a schematic diagram of distinguishing modes of operation by synchronization signals according to an embodiment of the present invention.

As shown in FIG. 3, in this embodiment, the mode of operation of the narrow-band Internet of Things is determined according to a synchronization signal.

The narrow-band Internet of Things may have three available modes of operation: stand-alone mode of operation, guard-band mode of operation and in-band mode of operation. Different modes of operation may adopt different designing and processing manners. For example, three different designing and processing manners correspond to three modes of operation; or two different designing and processing manners correspond to three modes of operation (where the stand-alone mode of operation employs one designing and processing manner, and the guard-band mode of operation and the in-band mode of operation employ another designing and processing manner; or the stand-alone mode of operation and the guard-band mode of operation employ one designing and processing manner, and the in-band mode of operation employs another designing and processing manner). Therefore, the base station and the user equipment need to determine in which mode of operation the narrow-band Internet of Things is working, so as to transmit and receive signals in a manner corresponding to the mode of operation.

This embodiment uses a synchronization signal to distinguish the mode of operation of the narrow-band Internet of Things. Synchronization signals for distinguishing the mode of operation include, but are not limited to the following information: primary synchronization signals, secondary synchronization signals, scrambling sequences of the secondary synchronization signals, combination modes of the sequences in the secondary synchronization signals, relative positions of the primary synchronization signals and the secondary synchronization signals in the time domain and/or frequency domain, and the like. The specific implementation may be as follows:

Three different primary synchronization signals are designed such that three different modes of operation are distinguished by different primary synchronization signals. Alternatively, two different primary synchronization signals are designed, one of which is used to indicate the stand-alone mode of operation, and the other one is used to indicate the guard-band mode of operation and the in-band mode of operation. Alternatively, one of the primary synchronization signals is used to indicate the stand-alone mode of operation and the guard-band mode of operation; and the other of the primary synchronization signal is used to indicate the in-band mode of operation. Here, different primary synchronization signals may refer to different generation manners of primary synchronization signal sequences or different sequence numbers of primary synchronization signals. For example, the sequence of primary synchronization signals may be generated by a Zadoff-Chu sequence, a pseudo-noise (PN) sequence, a Walsh-Hadamard sequence, a Gold sequence, or a Golomb sequence. For example, the primary synchronization signal sequence for the stand-alone mode of operation adopts a Walsh-Hadamard sequence; the primary synchronization signal sequence for the guard-band mode of operation adopts a PN sequence; and the primary synchronization signal sequence for the in-band mode of operation adopts a Zadoff-Chu sequence. By detecting different sequences, the modes of operation can be distinguished. The different sequence numbers of the primary synchronization signals may refer to different root sequences of primary synchronization signal sequences adopting the same generation manner, or sequences obtained by performing different cyclic shifting on the same root sequence. For example, the primary synchronization signals in the stand-alone mode of operation, the guard-band mode of operation, and the in-band mode of operation may refer to different root sequences generated in the same manner (for example, adopting a Zadoff-Chu sequence), or sequences obtained by performing different cyclic shifting on the same root sequence.

Alternatively, the primary synchronization signals may be the same, but three secondary synchronization signals or three groups of different secondary synchronization signals are designed so that different modes of operation are indicated by different secondary synchronization signals or group numbers. Alternatively, the primary synchronization signals may be the same, but two secondary synchronization signals or two groups of different secondary synchronization signals are designed, where one of the primary synchronization signals or group numbers is used to indicate the stand-alone mode of operation and the other one is used to indicate the guard-band mode of operation and the in-band mode of operation. Alternatively, one of the secondary synchronization signals or group numbers is used to indicate the stand-alone mode of operation, and the other one is used to indicate the in-band mode of operation. Here, different secondary synchronization signals refer to different generation manners of the secondary synchronization signals or different sequence numbers of the secondary synchronization signals.

Alternatively, the primary synchronization signals and the secondary synchronization signals may be the same; and different modes of operation are distinguished by the relative positions of the primary synchronization signals and the secondary synchronization signals in the time domain and/or frequency domain.

Alternatively, the primary synchronization signals and the secondary synchronization signals may be the same; and different modes of operation are indicated by different scrambling sequences of the secondary synchronization signals.

Alternatively, the primary synchronization signals are the same; and different modes of operation are indicated by generating different combination modes of multiple sequences of the secondary synchronization signals.

Embodiment 2

The type of the master information block is implicitly or explicitly indicated by the synchronization signals.

Figure 4:
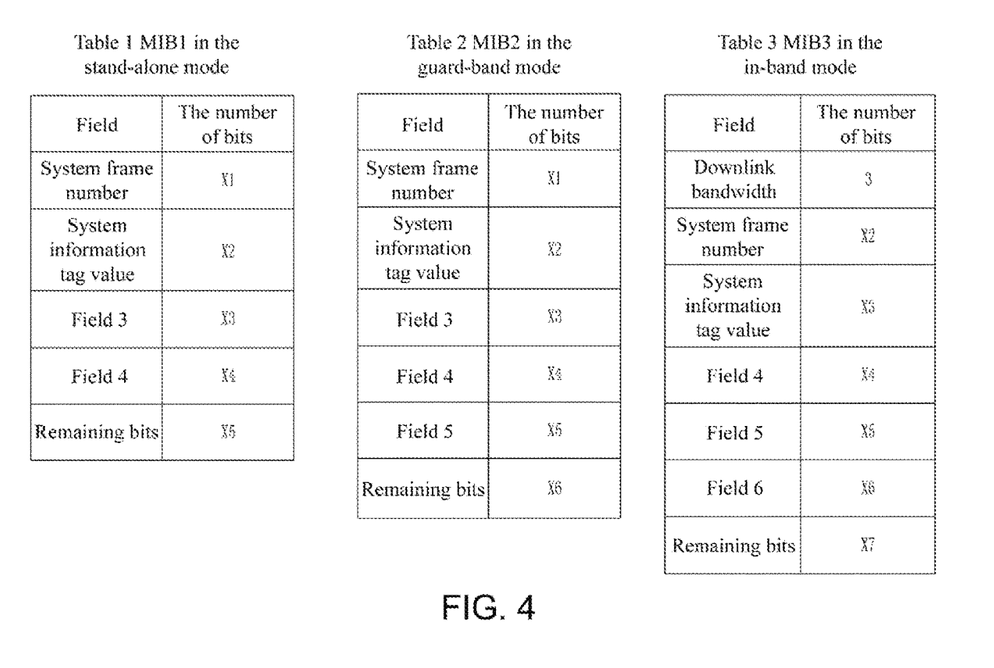
FIG. 4 illustrates a schematic diagram of an example of a master information block of three modes of operation according to an embodiment of the present invention.

The narrow-band Internet of Things may define a variety of master information blocks; and different master information blocks are used for different application scenarios or different modes of operation. As shown in FIG. 4, the narrow-band Internet of Things can define three types of master information blocks in advance: MIB1, MIB2, and MIB3. MIB1 is used for the stand-alone mode of operation; MIB2 is used for the guard-band mode of operation; and MIB3 is used for the in-band mode of operation. The content of MIB1, the content of MIB2, and the content of MIB3 are not the same. In other words, some fields in the content of MIB1, MIB2, and MIB3 are the same, and other fields are different. The transport block sizes (TBSs) of MIB1, MIB2, and MIB3 may be either the same or different.

Alternatively, two master information blocks may be defined in advance: MIB1 and MIB2. MIB1 is used for the stand-alone mode of operation; and MIB2 is used for the guard-band mode of operation and the in-band mode of operation. Alternatively, MIB1 is used for the stand-alone mode of operation and the guard-band mode of operation; and MIB2 is used for the in-band mode of operation. The content of MIB1 is different from that of MIB2. In other words, some fields in the content of MIB1 and MIB2 are the same, and other fields are different. The transport block sizes (TBSs) of MIB1 and MIB2 may be either the same or different.

Figure 5:
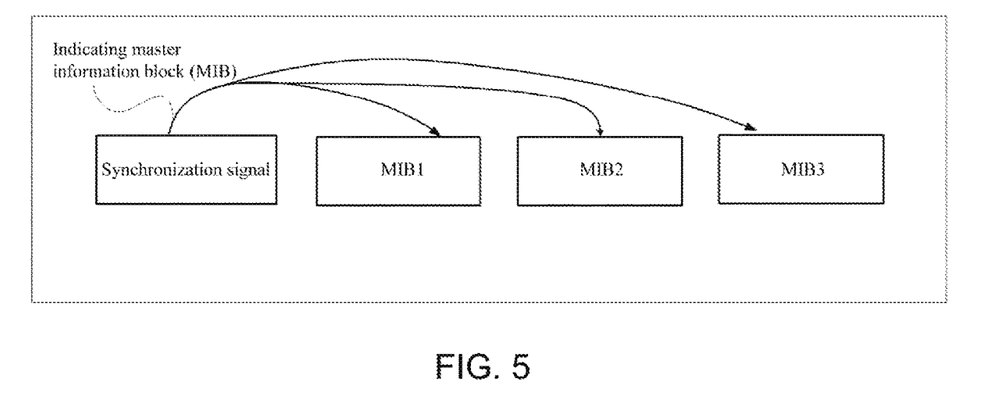
FIG. 5 illustrates a schematic diagram of distinguishing master information blocks by synchronization signals according to an embodiment of the present invention.

As shown in FIG. 5, the master information blocks used may be implicitly or explicitly indicated by synchronization signals. The synchronization signals used to indicate the master information blocks include but are not limited to the following information: primary synchronization signals, secondary synchronization signals, scrambling sequences of the secondary synchronization signals, combination modes of sequences in the secondary synchronization signals, and relative positions of the primary synchronization signals and the secondary synchronization signals in the time domain and/or frequency domain, and the like. The specific implementation may be as follows:

Three different primary synchronization signals are designed so that the three master information blocks MIB1, MIB2 and MIB3 are implicitly or explicitly distinguished by different primary synchronization signals. Alternatively, two different primary synchronization signals are designed, one of which is used to implicitly or explicitly indicate MIB1 and the other is used to implicitly or explicitly indicate MIB2 and MIB3. Here, MIB2 and MIB3 may be either the same or different. Alternatively, one of the primary synchronization signals is used to implicitly or explicitly indicate MIB1 and MIB2, where MIB1 and MIB2 may be either the same or different. The other one of the primary synchronization signals is used to implicitly or explicitly indicate MIB3. Here, the above-mentioned different primary synchronization signals may refer to different generation manners of primary synchronization signal sequences, or different sequence numbers of primary synchronization signals. For example, the sequence of primary synchronization signals may be generated by a Zadoff-Chu sequence, a pseudo-noise (PN) sequence, a Walsh-Hadamard sequence, a Gold sequence, or a Golomb sequence and the like. For example, the primary synchronization signal sequence corresponding to MIB1 adopts a Walsh-Hadamard sequence; the primary synchronization signal sequence corresponding to MIB2 adopts a PN sequence; and the primary synchronization signal sequence corresponding to MIB3 adopts a Zadoff-Chu sequence. By detecting different sequences, the type of the master information block can be distinguished. The different sequence numbers of the primary synchronization signals may refer to different root sequences of primary synchronization signal sequences adopting the same generation manner, or sequences obtained by performing different cyclic shifting on the same root sequence. For example, the primary synchronization signals respectively corresponding to MIB1, MIB2 and MIB3 may be different root sequences generated in the same manner (for example, adopting a Zadoff-Chu sequence) or sequences obtained by performing different cyclic shift on the same root sequence.

Alternatively, the primary synchronization signals may be the same, but three secondary synchronization signals or three groups of different secondary synchronization signals are designed so that the three types of primary information blocks MIB1, MIB2, and MIB3 are implicitly or explicitly indicated by different secondary synchronization signals or group numbers. Alternatively, the primary synchronization signals may be the same, but two secondary synchronization signals or two groups of different secondary synchronization signals are designed, where one of the secondary synchronization signals or group numbers is used to implicitly or explicitly indicate the primary information block MIB1 and the other one is used to implicitly or explicitly indicate the master information blocks MIB2 and MIB3. Here, MIB2 and MIB3 may be either the same or different. Alternatively, one of the secondary synchronization signals or group numbers is used to implicitly or explicitly indicate MIB1 and MIB2, where MIB1 and MIB2 may be either the same or different. The other secondary synchronization signal or group number is used to implicitly or explicitly indicate the master information block MIB3 in the in-band mode of operation. The above-mentioned different secondary synchronization signals refer to different generation manners of the secondary synchronization signals or different sequence numbers of the secondary synchronization signals.

Alternatively, the primary synchronization signals and the secondary synchronization signals may be the same; and different master information blocks MIB1, MIB2 and/or MIB3 are implicitly or explicitly distinguished by the relative positions of the primary synchronization signals and the secondary synchronization signals in the time domain and/or frequency domain.

Alternatively, the primary synchronization signals and the secondary synchronization signals may be the same; and different master information blocks MIB1, MIB2 and/or MIB3 are implicitly or explicitly distinguished by the different scrambling sequences of the secondary synchronization signals.

Alternatively, the primary synchronization signals may be the same; and different master information blocks MIB1, MIB2 and/or MIB3 are implicitly or explicitly distinguished by generating different combination modes of multiple sequences of the secondary synchronization signals.

Embodiment 3

A reference signal (RS) used for physical broadcast channel (PBCH) demodulation is implicitly or explicitly indicated by a synchronization signal.

Figure 61:
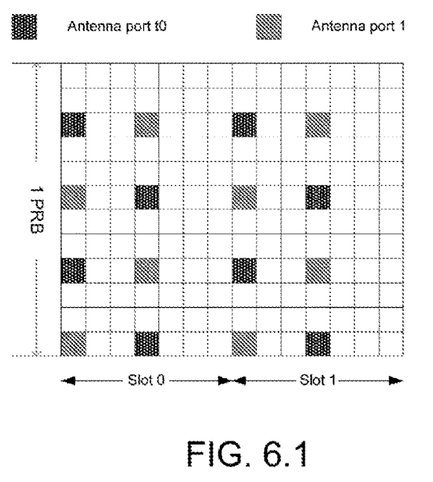
Figure 62:
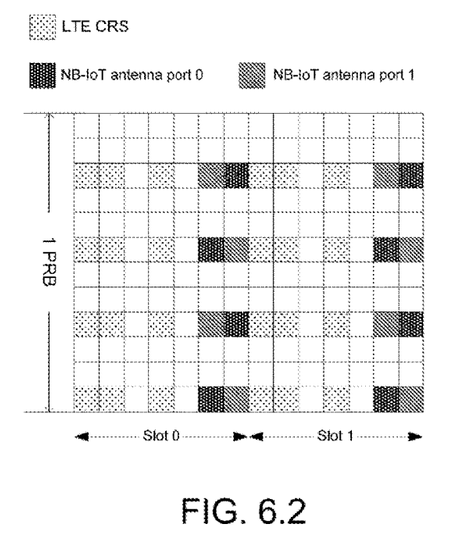
Figure 63:
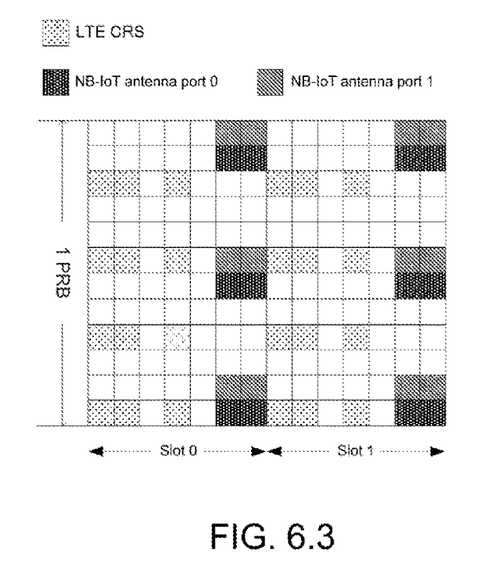

As shown in FIG. 6, there may be three types of reference signals. FIG. 6.1 shows Cell Specific Reference Signals (CRSs) of two antenna ports of the existing LTE; FIG. 6.2 shows an example of a CRS designed specifically for NB-IOT, where the CRS avoids CRSs of four antenna ports of the existing LTE; FIG. 6.3 shows an example of a Demodulation Reference Signal (DMRS) designed specifically for NB-IOT, where the DMRS also avoids the CRSs of four antenna ports of the existing LTE.

Different modes of operation may adopt different reference signals for demodulation of a PBCH and/or other physical channels. For example, the reference signal of FIG. 6.1 may be used for demodulation of a PBCH and/or other physical channels in the stand-alone mode of operation; the reference signal of FIG. 6.2 may be used for demodulation of a PBCH and/or other physical channels in the guard-band mode of operation; the reference signal of FIG. 6.3 may be used for demodulation of a PBCH and/or other physical channels in the in-band mode of operation. Alternatively, the reference signal of FIG. 6.1 may be used for demodulation of a PBCH and/or other physical channels in the stand-alone mode of operation and the guard-band mode of operation; the reference signal of FIG. 6.2 or the reference signal of FIG. 6.3 may be used for demodulation of a PBCH and/or other physical channels in the in-band mode of operation. Alternatively, the reference signal of FIG. 6.1 may be used for demodulation of a PBCH and/or other physical channels in the stand-alone mode of operation; the reference signal of FIG. 6.2 or the reference signal of FIG. 6.3 may be used for demodulation of a PBCH and/or other physical channels in the guard-band mode of operation and the in-band mode of operation.

Before completing a cell search and performing PBCH demodulation, an NB-IOT user needs to know a reference signal that can be used for PBCH demodulation. The reference signal may be implicitly or explicitly indicated by a synchronization signal. The synchronization signals of the reference signal for indicating PBCH demodulation include but are not limited to the following information: primary synchronization signals, secondary synchronization signals, scrambling sequences of the secondary synchronization signals, combination modes of sequences in the secondary synchronization signals, and relative positions of the primary synchronization signals and the secondary synchronization signals in the time domain and/or frequency domain, and the like. The specific implementation may be as follows:

Three different primary synchronization signals are designed so that reference signals for PBCH demodulation are implicitly or explicitly distinguished by different primary synchronization signals. Alternatively, two different primary synchronization signals are designed, one of which is used to implicitly or explicitly indicate the reference signal for PBCH demodulation in the stand-alone mode of operation and the guard-band mode of operation and the other is used to implicitly or explicitly indicate the reference signal for PBCH demodulation in the in-band mode of operation. Alternatively, one of the primary synchronization signals is used to implicitly or explicitly indicate the reference signal for PBCH demodulation in the stand-alone mode of operation. The other of the primary synchronization signals is used to implicitly or explicitly indicate the reference signal for PBCH demodulation in the guard-band mode of operation and the in-band mode of operation. The above-mentioned different primary synchronization signals may refer to different generation manners of primary synchronization signal sequences or different sequences of primary synchronization signals and the like. Here, the sequence of primary synchronization signals may be generated by a Zadoff-Chu sequence, a pseudo-noise (PN) sequence, a Walsh-Hadamard sequence, a Gold sequence, or a Golomb sequence. For example, the primary synchronization signal sequence for the stand-alone mode of operation adopts a Walsh-Hadamard sequence; the primary synchronization signal sequence for the guard-band mode of operation adopts a PN sequence; and the primary synchronization signal sequence for the in-band mode of operation adopts a Zadoff-Chu sequence. By detecting different sequences, the modes of operation can be distinguished. The different sequence numbers of the primary synchronization signals refer to different root sequences of the primary synchronization signal sequences adopting the same generation manner, or sequences obtained by performing different cyclic shifting on the same root sequence.

Alternatively, the primary synchronization signals may be the same, but three secondary synchronization signals or three groups of different secondary synchronization signals are designed so that reference signals for PBCH demodulation are implicitly or explicitly distinguished by the different secondary synchronization signals or group numbers. Alternatively, the primary synchronization signals may be the same, but two secondary synchronization signals or two groups of different secondary synchronization signals are designed, where one of the secondary synchronization signals or group numbers is used to implicitly or explicitly indicate the reference signal for PBCH demodulation in the stand-alone mode of operation and the guard-band mode of operation, and the other one is used to implicitly or explicitly indicate the reference signal for PBCH demodulation in the in-band mode of operation. Alternatively, one of the secondary synchronization signals or group numbers is used to implicitly or explicitly indicate the reference signal for PBCH demodulation in the stand-alone mode of operation. The other secondary synchronization signal is used to implicitly or explicitly indicate the reference signal for PBCH demodulation in the guard-band mode of operation and the in-band mode of operation. The above-mentioned different secondary synchronization signals refer to different generation manners of the secondary synchronization signals or different sequence numbers of the secondary synchronization signals and the like.

Alternatively, the primary synchronization signals and the secondary synchronization signals may be the same; and the reference signals for PBCH demodulation are implicitly or explicitly distinguished by the relative positions of the primary synchronization signals and the secondary synchronization signals in the time domain and/or frequency domain.

Alternatively, the primary synchronization signals and the secondary synchronization signals may be the same; and the reference signals for PBCH demodulation are implicitly or explicitly distinguished by the different scrambling sequences of the secondary synchronization signals.

Alternatively, the primary synchronization signals may be the same; and the reference signals for PBCH demodulation are implicitly or explicitly distinguished by generating different combination modes of multiple sequences of the secondary synchronization signals.

Embodiment 4

A starting OFDM symbol for downlink transmission/reception may be implicitly or explicitly indicated by a synchronization signal.

Figure 7:
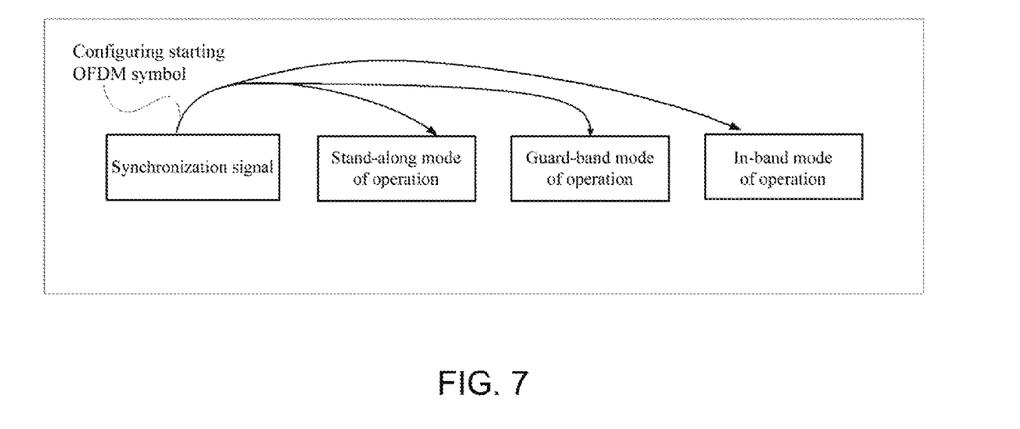
FIG. 7 illustrates a schematic diagram of configuring a starting OFDM symbol based on synchronization signals according to an embodiment of the present invention.

For different modes of operation, their starting OFDM symbols may be different. For example, the in-band mode of operation needs to avoid the Physical Downlink Control Channel (PDCCH) control region of the existing LTE; and the size of the PDCCH control region of the existing LTE is obtained by the Physical Control Format Indicator Channel (PCFICH). The stand-alone mode of operation and the guard-band mode of operation are not subject to such limitation. Therefore, the starting OFDM symbols in different modes of operation may be different. As shown in FIG. 7, the starting OFDM symbol in each mode of operation may be implicitly or explicitly indicated by a synchronization signal.

The synchronization signals used to indicate the starting OFDM symbol include but are not limited to the following information: primary synchronization signals, secondary synchronization signals, scrambling sequences of the secondary synchronization signals, combination modes of sequences in the secondary synchronization signals, and relative positions of the primary synchronization signals and the secondary synchronization signals in the time domain and/or frequency domain, and the like. The specific implementation may be as follows:

Three different primary synchronization signals are designed so that the starting OFDM symbols in various modes of operation are implicitly or explicitly indicated by different primary synchronization signals. Alternatively, two different primary synchronization signals are designed, one of which is used to implicitly or explicitly indicate starting OFDM symbols used in the stand-alone mode of operation and the guard-band mode of operation, and the other is used to implicitly or explicitly indicate a starting OFDM symbol used in the in-band mode of operation. Alternatively, one of the primary synchronization signals is used to implicitly or explicitly indicate the starting OFDM symbol used in the stand-alone mode of operation. The other primary synchronization signal is used to implicitly or explicitly indicate the starting OFDM symbols used in the guard-band mode of operation and in the in-band mode of operation. Herein, the above-mentioned different primary synchronization signals may refer to different generation manners of primary synchronization signal sequences or different sequence numbers of primary synchronization signals and the like. Here, the sequence of primary synchronization signals may be generated by a Zadoff-Chu sequence, a pseudo-noise (PN) sequence, a Walsh-Hadamard sequence, a Gold sequence, or a Golomb sequence and the like. For example, the primary synchronization signal sequence for the stand-alone mode of operation adopts a Walsh-Hadamard sequence; the primary synchronization signal sequence for the guard-band mode of operation adopts a PN sequence; and the primary synchronization signal sequence for the in-band mode of operation adopts a Zadoff-Chu sequence. By detecting different sequences, the modes of operation can be distinguished. The different sequence numbers of the primary synchronization signals refer to different root sequences of the primary synchronization signal sequences adopting the same generation manner, or sequences obtained by performing different cyclic shifting on the same root sequence. For example, the primary synchronization signals in the stand-alone mode of operation, the guard-band mode of operation, and the in-band mode of operation may refer to different root sequences generated in the same manner (for example, adopting a Zadoff-Chu sequence), or sequences obtained by performing different cyclic shifting on the same root sequence.

Alternatively, the primary synchronization signals may be the same, but three secondary synchronization signals or three groups of different secondary synchronization signals are designed so that the starting OFDM symbols in various modes of operation are implicitly or explicitly indicated by different secondary synchronization signals or group numbers. Alternatively, the primary synchronization signals may be the same, but two secondary synchronization signals or two groups of different secondary synchronization signals are designed, where one of the secondary synchronization signals or group numbers is used to implicitly or explicitly indicate the starting OFDM symbols in the stand-alone mode of operation and the guard-band mode of operation, and the other one is used to implicitly or explicitly indicate the starting OFDM symbol in the in-band mode of operation. Alternatively, one of the secondary synchronization signals or group numbers is used to implicitly or explicitly indicate the starting OFDM symbol in the stand-alone mode of operation. The other secondary synchronization signal or group number is used to implicitly or explicitly indicate the starting OFDM symbols in the guard-band mode of operation and the in-band mode of operation. The above-mentioned different secondary synchronization signals refer to different generation manners of the secondary synchronization signals or different sequence numbers of the secondary synchronization signals and the like.

Alternatively, the primary synchronization signals and the secondary synchronization signals may be the same; and the starting OFDM symbols in various modes of operation are implicitly or explicitly indicated by the relative positions of the primary synchronization signals and the secondary synchronization signals in the time domain and/or frequency domain.

Alternatively, the primary synchronization signals and the secondary synchronization signals may be the same; and the starting OFDM symbols in various modes of operation are implicitly or explicitly indicated by different scrambling sequences of the secondary synchronization signals.

Alternatively, the primary synchronization signals may be the same; and the starting OFDM symbols in various modes of operation may be implicitly or explicitly indicated by generating different combination modes of multiple sequences of the secondary synchronization signals.

Embodiment 5

A starting OFDM symbol for downlink transmission/reception is implicitly or explicitly indicated by a master information block.

In some embodiments, the master information block may include a field for indicating a starting OFDM symbol for downlink reception.

The field indicating the starting OFDM symbol for downlink reception may occupy 1 or 2 bits in a predefined position in the master information block. The predefined position may include: a starting position, a middle position, an ending position, or other positions in the master information block.

The field indicating the starting OFDM symbol for downlink reception may further define meanings of other fields in the master information block.

Figure 8:
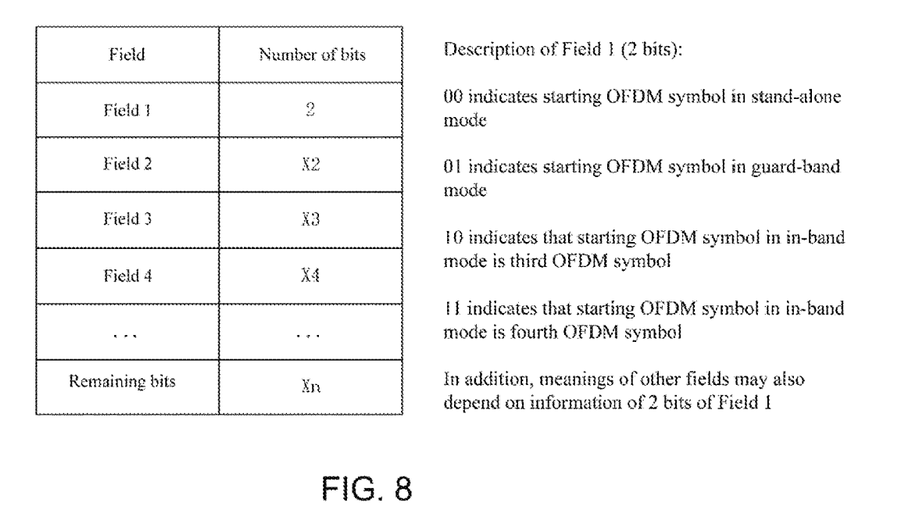
FIG. 8 illustrates a schematic diagram of an example in which a starting OFDM symbol is indicated by a master information block according to an embodiment of the present invention.

FIG. 8 is a schematic diagram of an exemplary master information block. In the example of FIG. 8, the first 2 bits are field 1 and may be used to indicate the starting OFDM symbols in different modes of operation. For example, 00 indicates the starting OFDM symbol in the stand-alone mode of operation; 01 indicates the starting OFDM symbol in the guard-band mode of operation. However, the specific values of the starting OFDM symbols in the stand-alone mode of operation and the guard-band mode of operation may be obtained by means of predefined, or common signaling configuration, or UE-specific signaling configuration. 10 and 11 indicate the starting OFDM symbol in the in-band mode of operation. For example, 10 indicates that the starting OFDM symbol in the in-band mode of operation is the 3rd OFDM symbol; and 11 indicates that the starting OFDM symbol in the in-band mode of operation is the 4th OFDM symbol. Alternatively, 10 indicates that the starting OFDM symbol in the in-band mode of operation is the 2nd OFDM symbol; and 11 indicates that the starting OFDM symbol in the in-band mode of operation is the 3rd OFDM symbol.

In addition, in FIG. 8, the meanings of other fields may be interpreted depending on the field 1. For example, when field 1 is 00, the meaning of field 2 to field n in the master information block may be one interpretation (e.g., interpretation 1); when field 1 is 01, the meaning of field 2 to field n in the master information block may be another interpretation (e.g., interpretation 2); when field 1 is 10, the meaning of field 2 to field n in the master information block is interpretation 3; and when field 1 is 10, the meaning of field 2 to field n in the master information block is interpretation 4. The number of fields for various interpretations may or may not be the same.

Alternatively, the 2 bits of field 1 in FIG. 8 may be used to indicate different modes of operation. For example, 00 indicates the stand-alone mode of operation; 01 indicates the guard-band mode of operation; 10 indicates the in-band mode of operation; 11 indicates a reservation. The starting OFDM symbol in each mode of operation may be implicitly obtained from its mode of operation.

Alternatively, the field for indicating the starting OFDM symbols in different modes of operation may be located at the end of the master information block.

Alternatively, the field for indicating the starting OFDM symbols in different modes of operation may be located in the middle position or in any other pre-fixed position in the master information block.

Embodiment 6

The mode of operation of the NB-IOT is determined by the operating band of the narrow-band Internet of Things.

In the 3GPP TS 36.101 document, the operating band of LTE is defined. In this embodiment, the modes of operation of the narrow-band Internet of Things may be determined by the operating band. For example, when the narrow-band Internet of Things works on the LTE band, the modes of operation of the narrow-band Internet of Things are the in-band mode of operation and the guard-band mode of operation. When the narrow-band Internet of Things works on other bands than the operating band of the LTE, the mode of operation of the narrow-band Internet of Things is the stand-alone mode of operation.

Figure 9:
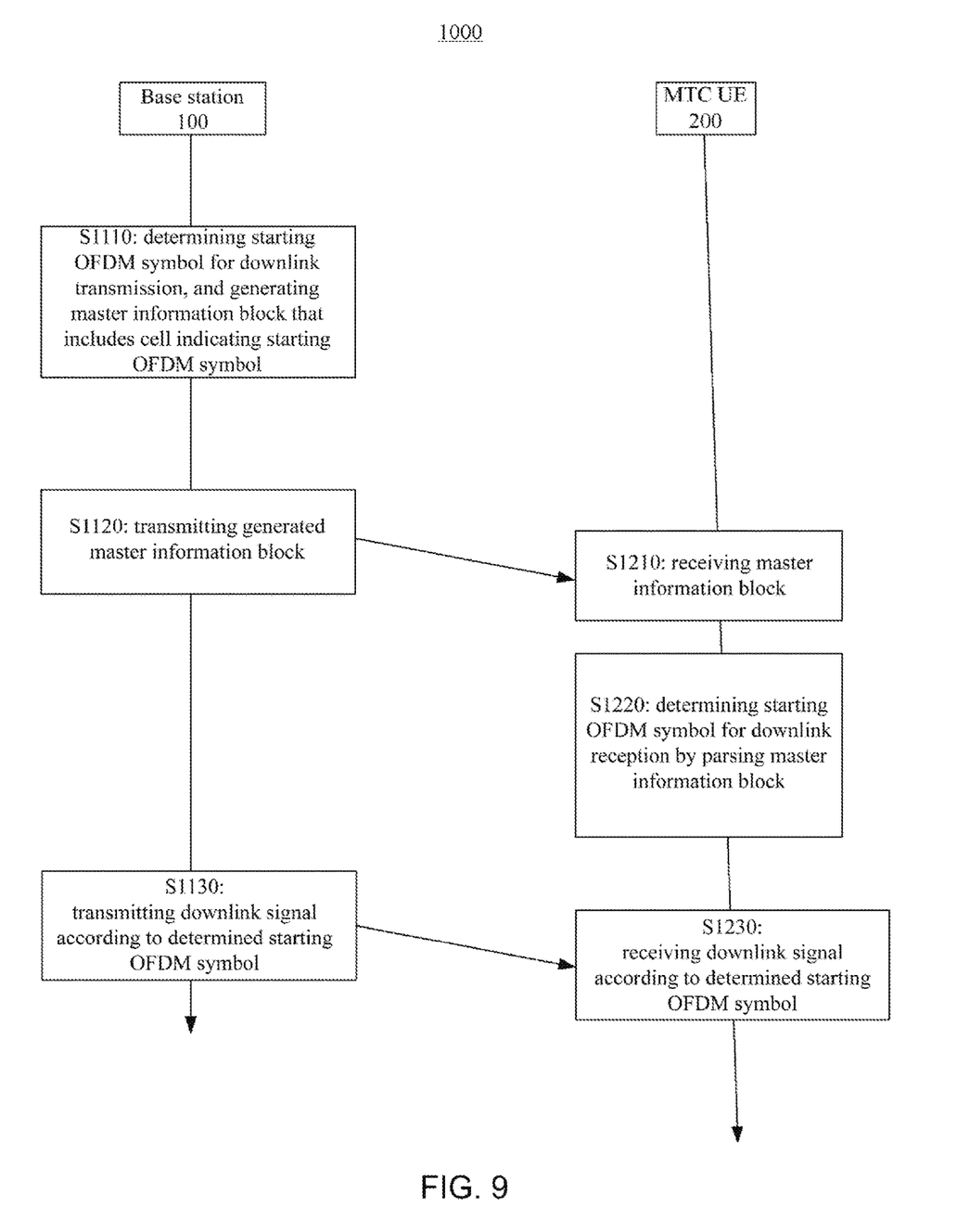
FIG. 9 illustrates a flowchart of an example of a method for transmitting a downlink signal according to an embodiment of the present invention.

FIG. 9 shows a flowchart of an example of a transmission method 1000 according to an embodiment of the present invention that can be implemented in a communication system supporting the narrow-band Internet of Things. The communication system may include one or more base stations (BSs) 100 supporting the narrow-band Internet of Things and one or more user equipments (UEs) 200 supporting the narrow-band Internet of Things. Although only one BS 100 and one UE 200 are shown in the figure, the present invention may include more BSs and more UEs. The present invention is not limited in this respect.

As shown in the figure, in step S1110, the BS 100 (specifically, the processing unit 120 of the BS) determines a starting OFDM symbol for downlink transmission and generates a master information block that includes a field indicating the starting OFDM symbol.

In step S1120, the BS 100 (specifically, the transmitting unit 110 of the BS) transmits the generated master information block.

In step S1210, the UE 200 (specifically, the receiving unit 210 of the UE) receives the master information block.

In step S1220, the UE 200 determines a starting OFDM symbol for downlink reception by parsing the field in the received master information block, the field being used to indicate the OFDM symbol for downlink reception.

In step S1130, the BS 100 (specifically, the transmitting unit 110 of the BS) transmits a downlink signal according to the starting OFDM symbol determined in step S1110.

In step S1230, the UE 200 (specifically, the receiving unit 210 of the UE) receives the downlink signal according to the starting OFDM symbol determined in step S1220.

It should be understood that the method 1000 is merely exemplary and is not limited to the illustrated steps or sequence. For example, the method 1000 may include more or fewer steps. For example, optionally, the method 1100 may further include: determining, according to a synchronization signal, the type of the master information block to be received by the user equipment and/or the type of the reference signal to be used by the user equipment for PBCH demodulation; and transmitting/receiving, according to the result of the determination, the master information block and/or the reference signal for PBCH demodulation, and the like. As another example, optionally, the synchronization signal may be predefined. In this case, the base station may omit the step of determining the synchronization signal. Moreover, in some embodiments, several steps in the method 1000 may be combined into a single step to be performed; or a single step may be divided into multiple steps to be performed.

The operations of the BS 100 and the UE 200 have been described in detail above with reference to FIGS. 1-8; and the method 1000 will not be further elaborated here.

The methods and related equipment according to the present invention have been described above in conjunction with preferred embodiments. It should be understood by a person skilled in the art that the methods illustrated above are only exemplary. The method of the present invention is not limited to steps or sequences illustrated above. The network node and the user equipment illustrated above may comprise more modules, for example, may further comprise modules which can be developed or developed in future to be applied to a base station or modules of UE. Various identifiers shown above are only exemplary, but not for limitation; and the present invention is not limited to specific fields described as examples of these identifiers. A person skilled in the art would be taught by the illustrated embodiments to make many alterations and modifications.

It should be understood that the above embodiments of the present invention may be implemented through software, hardware or a combination of software and hardware. For example, various components of the base station and user equipment in the above embodiments can be realized through multiple devices, and these devices include but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving and transmitting functions. The "user equipment" refers to a user mobile terminal, such as a terminal equipment that can perform wireless communication with a base station or a micro base station, including a mobile phone, a notebook, or the like.

In addition, the embodiments of the present invention, disclosed here, may be implemented on a computer program product. More specifically, the computer program product is a product described as below. The product has a computer-readable medium on which a computer program logic is encoded. The computer program logic provides relevant operations to implement the above-described technical solution of the present invention when the product is executed on a computing equipment.

The computer program logic enables a processor to execute the operations (methods) described in the embodiments of the present invention when the product is executed on at least one processor of a computing system. Such an arrangement of the present invention is typically provided as software, a code, and/or other data structures that are configured or encoded on a computer-readable medium, such as a light medium (e.g., a CD-ROM), a floppy disk or a hard disk, or, for example, firmware or other media of microcodes on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present invention.

In addition, each functional module or each feature of the base station equipment and the terminal equipment used in each of the above embodiments may be implemented or executed by a circuit, which is usually one or more integrated circuits. Circuits designed to perform various functions described in this description may include general purpose processors, digital signal processors (DSPs), application specific integrated circuits (ASICs) or general purpose integrated circuits, field programmable gate arrays (FPGAs) or other programmable logic devices, discrete gate or transistor logic, or discrete hardware components, or any combination of the above. The general purpose processor may be a microprocessor, or the processor may be an existing processor, a controller, a microcontroller, or a state machine. The above-described general purpose processor or each circuit may be configured by a digital circuit or may be configured by a logic circuit. In addition, when an advanced technology that can replace current integrated circuits emerge due to advances in semiconductor technology, the present invention may also use integrated circuits obtained using this advanced technology.

Although the present invention has been shown in connection with the preferred embodiments of the present invention, it will be understood by those skilled in the art that various modifications, substitutions and alterations may be made therein without departing from the spirit and scope of the present invention. Accordingly, the present invention should not be defined by the above-described embodiments, but should be defined by the appended claims and their equivalents.

The invention claimed is:

1. A user equipment (UE) comprising:
reception circuitry configured to receive a Master Information Block (MIB) including operation mode information indicating an operation mode determined from among in-band operation and stand-alone operation; and
determination circuitry configured to determine, based on the operation mode indicated by the operation mode information included in the MIB, a starting orthogonal frequency division multiplexing (OFDM) symbol for receiving a downlink control channel, the staring OFDM symbol corresponding to the operation mode indicated by the operation information included in the MIB, wherein
the reception circuitry is configured to receive the downlink control channel based on the starting OFDM symbol.

2. A method performed by a user equipment (UE) comprising:
receiving a Master Information Block (MIB) including operation mode information indicating an operation mode determined from among in-band operation and stand-alone operation; and
determining based on the operation mode indicated by the operation mode information included in the MIB, a starting orthogonal frequency division multiplexing (OFDM) symbol for receiving a downlink control channel, the staring OFDM symbol corresponding to the operation mode indicated by the operation information included in the MIB; and
receiving the downlink control channel based on the starting OFDM symbol.

3. A base station comprising:
determination circuitry configured to determine an operation mode from among in-band operation and stand-alone operation; and
transmission circuitry configured to transmit a Master Information Block (MIB) including operation mode information indicating the operation mode; wherein
the transmission circuitry is configured to transmit a downlink control channel based on a starting orthogonal frequency division multiplexing (OFDM) symbol corresponding to the operation mode.

4. A method performed by a base station comprising:
determining an operation mode from among in-band operation and stand-alone operation;
transmitting a Master Information Block (MIB) including operation mode information indicating the operation mode; and
transmitting a downlink control channel based on a starting orthogonal frequency division multiplexing (OFDM) symbol corresponding to the operation mode.

* * * * *